UNITED STATES PATENT OFFICE.

JOHN VON BÖHM, OF MELBOURNE, AUSTRALIA.

IMPROVED PROCESS FOR IMPROVING THE COLOR OF MOLASSES.

Specification forming part of Letters Patent No. 46,431, dated February 14, 1865.

*To all whom it may concern:*

Be it known that I, JOHN VON BÖHM, of Melbourne, in the Province of Victoria and Colony of Australia, have invented a new and Improved Process of Improving the Color and Flavor of Molasses; and I do hereby declare that the following is a full, clear, and exact description of the same.

The object of my invention is to improve the color of molasses, and to extract from it the unpleasant flavor which results from filtration through animal charcoal or from other causes; and my invention is based upon the discovery which I have made that this may be effected by the agency of tannin.

To enable others to use my invention, I will proceed to describe the mode in which I have practiced it with entire success.

I first dilute the molasses with water, generally with an equal volume thereof. I then add so much of a saturated infusion of nut-galls as will change the color to a very dark brown, generally about the same quantity as that of the water with which I first diluted the molasses, and stir till the whole is well mixed. I afterward add and stir into the mixture sulphuric acid of the ordinary commercial strength until the mixture is of a pale straw color. The quantity of sulphuric acid required to produce this effect will generally be about half an ounce for every pound of molasses. I next add and stir into the mixture as much carbonate of lime or other alkali as is necessary to almost entirely neutralize the acid, so that litmus paper will show scarcely any reaction. I then filter the mixture through felt or other mechanical filtering material, and evaporate by heat to the required density, and the filtered product thus obtained is molasses of a fine color and entirely free from any objectionable taste.

In neutralizing the acid care must be taken not to use an excess of alkali, but rather not to effect an absolutely perfect neutralization, for an excess of alkali would impair the color of the molasses, but an excess of free acid would be driven off by the subsequent evaporation.

It will be obvious to the chemist or skilled sugar-refiner that tannin in any other form than that which I have hereinabove specified may be used in carrying out my process.

I will remark that the quantities of tannin and of sulphuric acid necessary to effect the desired result will vary with the impurity of the molasses, and the exact quantities can only be determined by taking a small quantity of the molasses to be purified and trying the process in glass or other vessels. The quantities which I have hereinabove given will generally be sufficient.

What I claim as my invention, and desire to secure by Letters Patent, is—

The employment of tannin, substantially as herein described, in the purification of molasses.

DR. JOHN VON BÖHM.

Witnesses:
 HENRY T. BROWN,
 J. W. COOMBS.